… … 4,548,346

United States Patent [19]
Kraus et al.

[11] Patent Number: 4,548,346
[45] Date of Patent: Oct. 22, 1985

[54] DUAL LINE PRODUCTION SYSTEM AND METHOD

[75] Inventors: Josef Kraus, Neusäss; Karl-Heinz Klein, Augsburg, both of Fed. Rep. of Germany

[73] Assignee: Kuka Schweissanlagen & Roboter GmbH, Augsburg, Fed. Rep. of Germany

[21] Appl. No.: 474,544

[22] Filed: Apr. 14, 1983

[30] Foreign Application Priority Data

Mar. 13, 1982 [DE] Fed. Rep. of Germany ....... 3209222

[51] Int. Cl.⁴ .................... B65G 47/00; B23K 37/04
[52] U.S. Cl. ........................ 228/47; 29/563; 198/339.1
[58] Field of Search ............... 29/563, 564, 564.1; 198/339; 228/47, 7, 102; 219/79, 80

[56] References Cited

U.S. PATENT DOCUMENTS

| 3,239,079 | 3/1966 | Leavesley, Jr. ............. 198/339 |
| 3,381,744 | 5/1978 | Taccone ..................... 198/339 |
| 3,543,392 | 12/1970 | Perry et al. ............... 29/563 |
| 4,162,387 | 7/1979 | De Candia ................... 219/80 |
| 4,289,228 | 8/1981 | Reim et al. ................. 198/339 |
| 4,369,872 | 1/1983 | Sticht ........................ 198/339 |

FOREIGN PATENT DOCUMENTS

| 3209222 | 9/1983 | Fed. Rep. of Germany ........ 228/47 |
| 0753573 | 8/1980 | U.S.S.R. ..................... 29/564 |

Primary Examiner—Kenneth J. Ramsey
Assistant Examiner—Kurt Rowan
Attorney, Agent, or Firm—Karl F. Ross; Herbert Dubno

[57] ABSTRACT

A first succession of workpieces is displaced along a first conveyor path past a work station in steps and a second succession of workpieces is displaced past the work station in steps synchronously with the first succession along a second conveyor path crossing the first path at an intersection adjacent the work station. The workpieces of the first and second successions are alternately arrested adjacent the work station so that as a workpiece of one succession is arrested adjacent the station the workpieces of the other succession are moving and vice versa. A tool at the station works alternately on the arrested workpieces. Thus as a workpiece of one succession is being held stationary and worked on a workpiece of the other succession is being removed from adjacent the station and replaced with the following workpiece of the other succession. The workpieces are transported horizontally generally at the same level and the paths cross at the intersection generally at a right angle. Thus the tool is oscillated generally through a right angle between successive workpiece advance steps synchronously with workpiece advance. Four such tools can be provided to work on both sides of two stationary but succeeding workpieces of the same succession at the same time, then to work on both sides of two stationary but succeeding workpieces of the other succession while the first ones are transported away and replaced.

7 Claims, 2 Drawing Figures

DUAL LINE PRODUCTION SYSTEM AND METHOD

FIELD OF THE INVENTION

The present invention relates to a production system and method. More particularly this invention concerns a production-line manufacturing system and method wherein a succession of workpieces is moved past stationary work stations.

BACKGROUND OF THE INVENTION

In the mass production of large machines, for example automobiles or trucks, it is standard to move a succession of large workpieces such as chassis slowly in steps through a succession of work stations at each of which some operation, such as mounting a part or welding a seam, is carried out. For most operations the workpieces must be stationary, so their advance is usually stepped, that is with periodic full halts in motion.

The machinery that acts on the workpieces is frequently mainly automatic so that the jobs are frequently done in the stations at a rate much faster than the conveyor stepping cadence. As a result some machines, particularly robot welders, are frequently idle much of the time, that is they weld everything in reach in their work station on the workpiece in much less time than the period of the conveyor.

The longitudinal spacing, that is in the direction of travel, must be at least equal to the workpiece length. In addition the delivery of parts to a robot installing them is complicated by distance problems, and the large mass of the succession of workpieces also puts an upper limit to travel speed of the workpieces.

In order to prevent a valuable industrial robot from standing idle once its assigned chore is complete, it is therefore standard practice as described in German patent document No. 2,350,603 filed Sept. 10, 1973 by J. Kraus to provide the robot with a tool turret carrying a multiplicity of different tools. Thus while the workpiece is stopped next to the robot it can sequentially carry out a succession of tasks, for instance boring and then tapping holes.

Even with such an arrangement, however, the robot is idle during the time when the workpieces are moving. Due to their high mass, as mentioned above, displacement speed is very slow so that it is not uncommon for a valuable robot to be actually working only half the time.

In addition all of the known industrial-robot production systems and methods are based on the standard straight-line production path with which production space can be increased by doubling back the line to form a plurality of parallel and adjacent production lines. In no manner is it possible to adapt these known systems to any arrangement giving more flexibility in layout of the production line, for instance having crossing line sections.

OBJECTS OF THE INVENTION

It is therefore an object of the present invention to provide an improved production system and method.

Another object is the provision of such a production system and method which overcome the above-given disadvantages.

Yet another object is the provision of such an arrangement which uses the industrial robots virtually continuously, thereby justifying their enormous cost.

A further object is to provide an improved industrial-robot production system and method which allow production lines to cross each other with an increase rather than a decrease in efficiency.

SUMMARY OF THE INVENTION

These objects are attained according to the instant invention in a production method wherein a first succession of workpieces is displaced along a first conveyor path past a work station in steps and a second succession of workpieces is displaced past the work station in steps synchronously with the first succession along a second conveyor path crossing the first path at an intersection adjacent the work station. The workpieces of the first and second successions are alternately stepped and arrested adjacent the work station so that as a workpiece of one succession is arrested adjacent the station the workpieces of the other succession are moving and vice versa. A tool at the station works alternately on the arrested workpieces. Thus as a workpiece of one succession is being held stationary and worked on a workpiece of the other succession is being removed from adjacent the station and replaced with the following workpiece of the other succession. In this manner the valuable robots can be kept going full time, thereby justifying their considerable cost.

The workpieces are transported according to this invention horizontally generally at the same level. In addition the paths cross at the intersection generally at a right angle. Thus the tool is oscillated generally through a right angle between successive workpiece advance steps synchronously with workpiece advance.

To maximize conveyor and tool or robot efficiency, four such tools are provided. Thus it is possible to work on both sides of two stationary but succeeding workpieces of the same succession at the same time, then to work on both sides of two stationary but succeeding workpieces of the other succession while the first ones are transported away and replaced. The efficiency of such a style of operation is enormous.

The production system of this invention therefore has first conveyor means for displacing a first succession of workpieces along a first conveyor path past a work station in steps and second conveyor means for displacing a second succession of workpieces past the work station in steps with the first succession along a second conveyor path crossing the first path at an intersection adjacent the work station synchronously and alternately with the first conveyor means so that as a workpiece of one succession stops adjacent the station the workpieces of the other succession are moving and vice versa. A tool at the work station is engageable with the workpieces of either of the paths and control means connected between the tool and both conveyor means operates the tool to work from the station alternately on the stopped workpieces. Thus as a workpiece of one succession is being held stationary and worked on a workpiece of the other succession is being removed from adjacent the station and replaced with the following workpiece of the other succession.

The tools according to this invention are industrial robots each comprising a stationary tool base provided at the work station with a pivot defining an upright tool pivot axis equispaced from the paths, a turret carrying the tool or even a plurality of tools and pivotal on the base about the tool axis, and means connected to the turret and to the control means for oscillating the tool generally through a right angle between successive workpiece advance steps synchronously with workpiece advance.

In order that the conveyors do not interfere with each other, they have a turntable at the intersection for guiding the workpieces through the intersection. Such a turntable could also conceivably even move a workpiece from one conveyor to the other.

DESCRIPTION OF THE DRAWING

The above and other features and advantages will become more readily apparent from the following, reference being made to the accompanying drawing in which.

SPECIFIC DESCRIPTION

Figure 1:
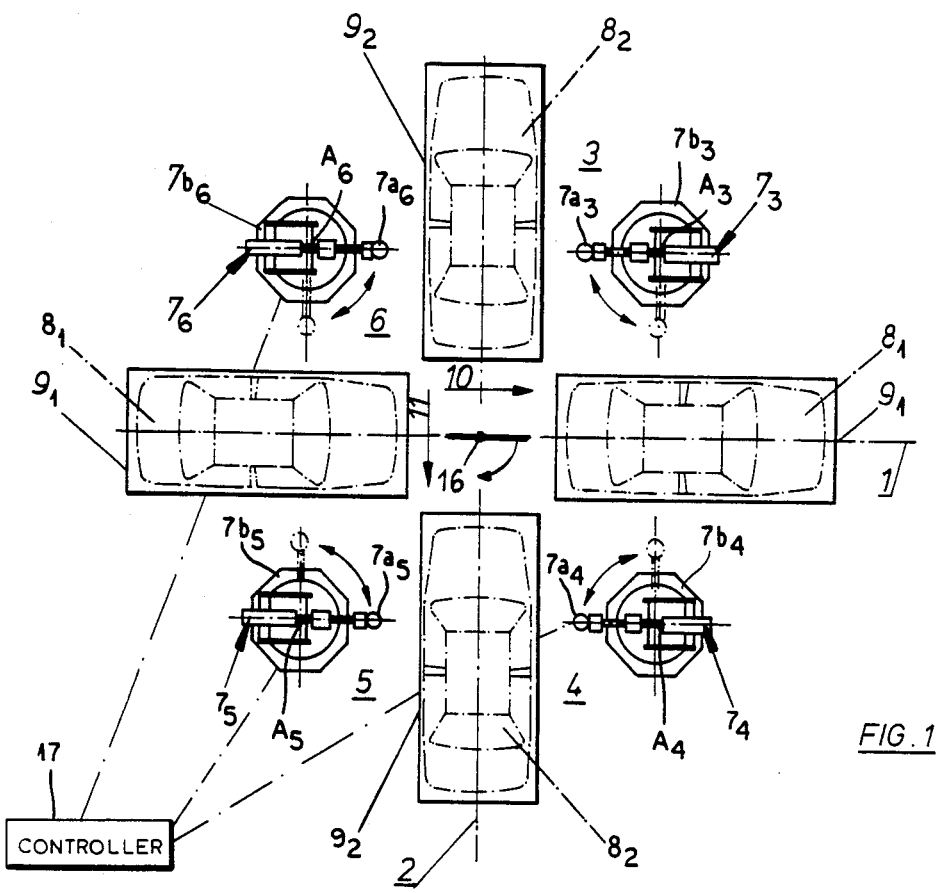
FIG. 1 is a mainly diagrammatic top view of the system according to this invention.
Figure 2:
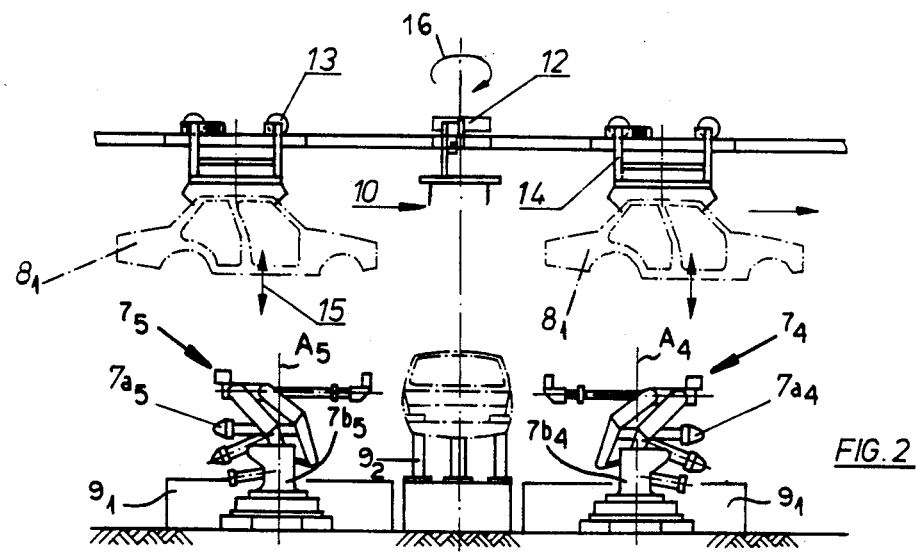
FIG. 2 is a side view of the system of FIG. 1.

As seen in FIGS. 1 and 2 a pair of crossing and perpendicular paths 1 and 2 define four sectors or work stations 3, 4, 5, and 6. Respective industrial robots $7_3$, $7_4$, $7_5$, and $7_6$ are provided in the respective stations 3, 4, 5, and 6. These robots are here welders having respective tools $7a_3$, $7a_4$, $7a_5$, and $7a_6$ pivotal on respective bases $7b_3$, $7b_4$, $7b_5$, and $7b_6$ about respective axes $A_3$, $A_4$, $A_5$, and $A_6$ equispaced from the paths 1 and 2 and from the intersection of these paths. They could also perform various machining, finishing, assembling, coating, or other functions as is well known the art. They are all operated by a central controller 17 that is again of the conventional microprocessor type.

The workpieces, here car bodies $8_1$ on the path 1 and $8_2$ on the path 2 are suspended from respective rails 13 by carriers 14 and can be deposited on respective ground-level holders $9_1$ and $9_2$ between the work stations 3-6. These trolleys 14 can raise and lower the workpieces $8_1$ and $8_2$ as indicated by arrow 15 in FIG. 2.

The path 1 moves in the direction indicate by the arrow 10 and the path 2 perpendicularly in the direction indicated by the arrow 11. The space between the leading end of one workpiece and the trailing end of the preceding one is somewhat greater than the width of the workpieces on the other path. In addition a pivotal turntable rail 16 operated through a drive 12 by the controller 17 can extend parallel to the main guide rail 13 of the conveyor 1 or of the conveyor 2.

The controller 17 operates the conveyors 1 and 2 alternately, moving the one by a single step equal to a workpiece length plus the length of the gap between workpieces while the other is stationary and vice versa. Simultaneously it operates the various tools $7_3$, $7_4$, $7_5$, and $7_6$ to work on opposite sides of the stationary workpieces. In the solid-line position of the illustrated example the tools $7_3$ and $7_6$ are acting on the right- and left-hand sides of the leading workpiece $8_2$ of the succession on the path 2 and the tools $7_4$ and $7_5$ are similarly working on the right- and left-hand sides of the trailing workpiece $8_2$ which is sitting in its holder $9_2$. During this operation the turntable rail 16 is aligned with the path 1 and the workpieces $8_1$ are being moved in direction 10 past the stations.

Once the two workpieces $8_2$ are finished the tools $7_3$-$7_6$ are swung into the dot-dash positions to work on the two workpieces $8_1$ that meanwhile have been positioned on the holders $9_1$ between them. In this mode, the tools $7_3$ and $7_4$ work in tandem as do the tools $7_5$ and $7_6$. It is a simple task to program the robots $7_3$-$7_6$ to work at such different tasks, since in effect at any time normally the two robots to each side of the nonmoving succession of workpieces are both doing the same thing, it is merely the pairing that changes each time the tools swivel through 90°.

Thus with this system the robots can be kept going virtually full time. In fact such an arrangement allows a relatively slow transport speed to be employed, one that spends as much time moving as stationary. In addition this system permits one to cross production lines and gain, rather than lose, productivity as a result. In fact the crossing of production lines can allow two sophisticated automatic work stations to service two different stages of production at two different locations along the same production line. When the tools or robots involved are particularly sophisticated, this doubling-up considerably reduces production costs.

We claim:

1. A production system comprising:
   first conveyor means for displacing a first succession of workpieces in a first transport direction along a first conveyor path past a work station in steps;
   second conveyor means for displacing a second succession of workpieces in a second transport direction generally perpendicular to the first direction past the work station in steps along a second conveyor path crossing the first path at an intersection adjacent the work station synchronously and alternately with the first conveyor means so that as a workpiece of one succession stops adjacent the station the workpieces of the other succession are moving and vice versa;
   a tool at the work station displaceable between a first position engageable with a workpiece of the first path and a second position engageable with a workpiece of the second path; and
   control means connected between the tool and both conveyor means for displacing the tool between its first and second positions and thereby working from the station alternately on the stopped workpieces with the tool with such synchronism that as a workpiece of one succession is being held stationary and worked on a workpiece of the other succession is being removed from adjacent the station in the respective transport direction and replaced with the following workpiece of the other succession.

2. The production system defined in claim 1 wherein the conveyor means and paths extend horizontally generally at the same level.

3. The production system defined in claim 5, further comprising
   a stationary tool base provided at the work station with a pivot defining an upright tool pivot axis equispaced from the paths;
   a turret carrying the tool and pivotal on the base about the tool axis; and
   means connected to the turret and to the control means for oscillating the tool generally through a right angle between its first and second positions between successive workpiece advance steps synchronously with workpiece advance.

4. The production system defined in claim 3 wherein a second such base, turret, and tool is provided diagonally across the intersection of the paths from the first-mentioned base, turret, and tool, the control means being connected to the second tool for operating same like the first tool.

5. The production system defined in claim 3 wherein a third and a fourth such base, turret, and tool are provided diagonally across from each other and between the first and second tools at the intersection of the paths, the control means being connected to the third and tool for operating same like the first tool.

6. The production system defined in claim 3 wherein the bases and turrets are constituted as industrial robots.

7. The production system defined in claim 1, further comprising:
   turntable means at the intersection for guiding the workpieces of each conveyor means through the intersection without interfering with the other conveyor means.

* * * * *